United States Patent [19]

Murray et al.

[11] Patent Number: 4,798,055

[45] Date of Patent: Jan. 17, 1989

[54] REFRIGERATION SYSTEM ANALYZER

[75] Inventors: Gary P. Murray, Montpelier; Ralph Lower, Bryan; Byron J. Dunham, Sherwood; Don A. Bulla, Bryan, all of Ohio

[73] Assignee: Kent-Moore Corporation, Warren, Mich.

[21] Appl. No.: 113,654

[22] Filed: Oct. 28, 1987

[51] Int. Cl.⁴ ............... F25B 49/00; G01M 19/00
[52] U.S. Cl. ................................. 62/127; 62/129; 165/11.1; 364/557
[58] Field of Search ............... 62/125, 126, 127, 129, 62/130; 236/74; 165/11.1; 364/551, 557, 506; 374/41, 116, 141, 166, 170, 183, 186, 208; 346/33 TP

[56] References Cited

U.S. PATENT DOCUMENTS

| | | | |
|---|---|---|---|
| 3,686,954 | 8/1972 | Motl | 62/125 X |
| 3,707,851 | 1/1973 | McAshan, Jr. | 62/125 |
| 4,146,085 | 3/1979 | Wills | 165/11 |
| 4,326,223 | 4/1982 | Cantley | 62/127 X |
| 4,334,275 | 6/1982 | Levine | 165/11.1 X |
| 4,376,510 | 3/1983 | Allard | 237/2 B |
| 4,381,549 | 4/1983 | Stomp Jr. et al. | 62/126 |
| 4,432,232 | 2/1984 | Brantley et al. | 62/127 X |
| 4,510,576 | 4/1985 | MacArthur et al. | 62/125 X |
| 4,538,419 | 9/1985 | Lord | 62/129 |
| 4,591,093 | 5/1986 | Elliott, Jr. | 165/11.1 X |
| 4,611,470 | 9/1986 | Enström | 62/127 |
| 4,636,093 | 1/1987 | Nagasaka et al. | 374/186 |

Primary Examiner—Harry B. Tanner
Attorney, Agent, or Firm—Barnes, Kisselle, Raisch, Choate, Whittemore & Hulbert

[57] ABSTRACT

Apparatus for analyzing air conditioning systems comprising a temperature probe adapted for manual placement at each of a plurality of preselected points in turn around the refrigerant loop to provide signals indicative of temperature at each point. Apparatus electronics are coupled by a cable to the temperature probe and includes facility for reading and storing each of the probe temperature measurements in turn. Information indicative of standards and ranges of temperature data for properly operating refrigeration systems of a number of models and manufacturers is prestored in apparatus memory. The system temperature readings are compared to each other and to the prestored data to diagnose a plurality of fault conditions and to display diagnosed fault conditions to an operator.

27 Claims, 14 Drawing Sheets

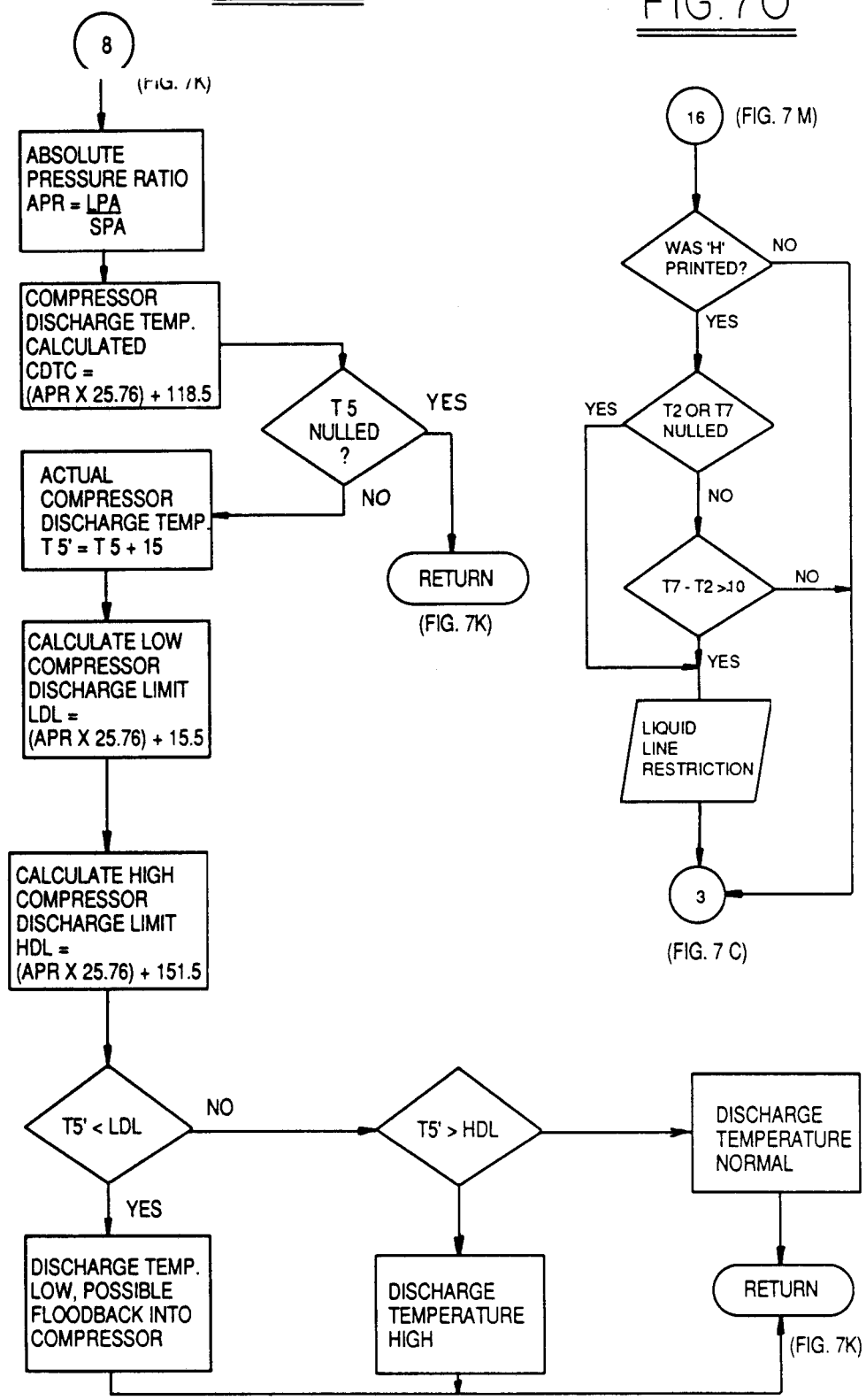

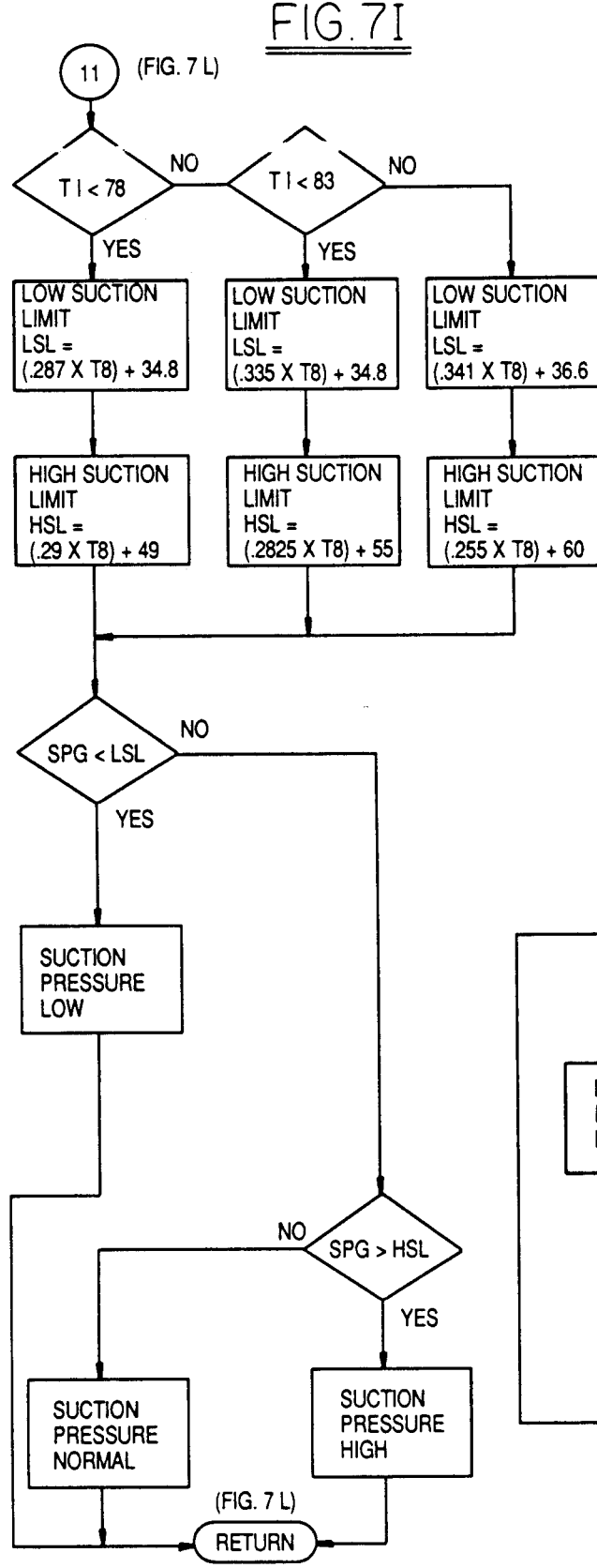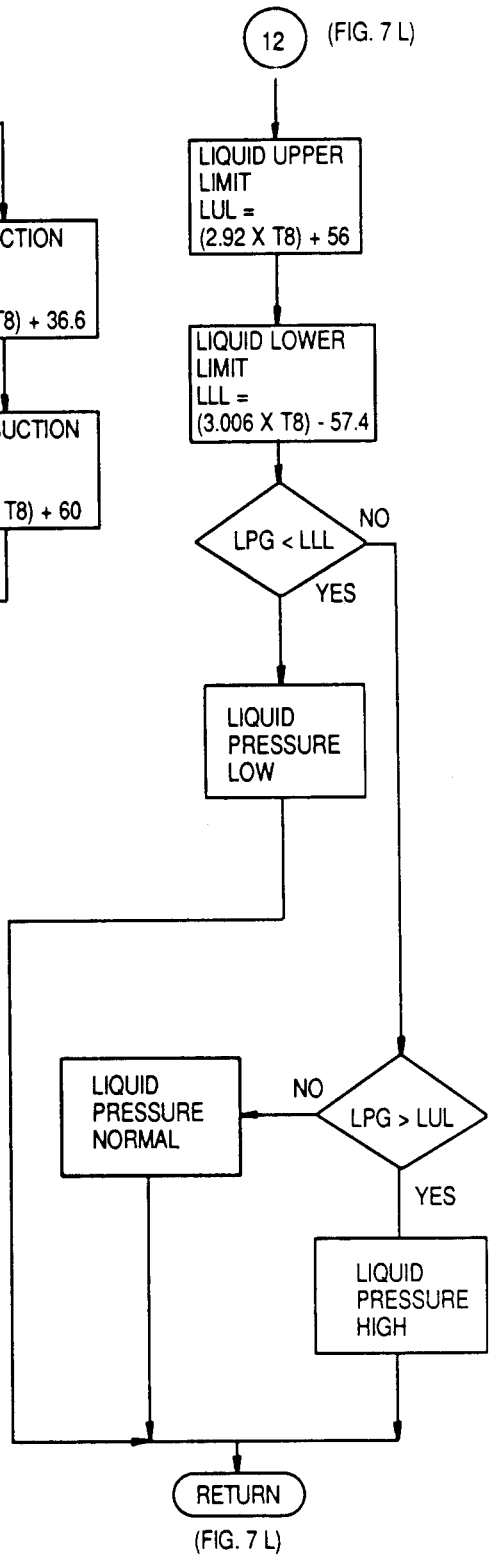
FIG.7I
FIG.7J (FIG. 7 L)

| IF | NORM. SUCT. PSI | NORM. DISCH. PSI | HIGH SUPER HEAT | NORM. SUPER HEAT | LOW SUPER HEAT | LOW SUCT. PSI | HIGH SUCT. PSI | LOW DISCH. PSI | HIGH DISCH. PSI | EXTRA LOW SUPER HEAT | EXTRA HIGH SUPER HEAT | THEN DISPLAY |
|---|---|---|---|---|---|---|---|---|---|---|---|---|
| ⓘ 14 ↓ | | | | | 1 | 1 | | 1 | | | | I, G |
| | | | | 1 | | 1 | | 1 | | | | I, F, G |
| | | | 1 | | | 1 | | 1 | | | | F, G, H |
| | | 1 | | | 1 | 1 | | | | | | I |
| | | 1 | | 1 | | 1 | | | | | | I, F |
| | | 1 | 1 | | | 1 | | | | | | F, H |
| | | | | | 1 | 1 | | | 1 | | | I, J, K, M |
| | | | | 1 | | 1 | | | 1 | | | I, F, J, K, M |
| | | | 1 | | | 1 | | | 1 | | | F, H, J, K, M |
| | 1 | | | | 1 | | | 1 | | | | I, G |
| | 1 | | 1 | | | | | 1 | | | | G |
| | 1 | 1 | | | | | | 1 | | | | G, P |
| | 1 | 1 | | | 1 | | | | | | | SATIS-FACTORY |
| | 1 | 1 | | | 1 | | | | | 1 | | N |
| | 1 | 1 | | 1 | | | | | | | | SATIS-FACTORY |
| | 1 | 1 | 1 | | | | | | | | 1 | F |
| | 1 | 1 | 1 | | | | | | | | | SATIS-FACTORY |
| | 1 | | | | 1 | | | | 1 | | | I, J, K, M |
| | 1 | | | 1 | | | | | 1 | | | J, K, M |
| | 1 | | 1 | | | | | | 1 | | | J, K, M, O |
| | | | | | 1 | | 1 | 1 | | | | L, N |
| | | | | 1 | | | 1 | 1 | | | | SATIS-FACTORY |
| | | | 1 | | | | 1 | 1 | | | | L |
| | | 1 | | | 1 | | 1 | | | | | N |
| | | 1 | | 1 | | | 1 | | | | | SATIS-FACTORY |
| | | 1 | 1 | | | | 1 | | | | | P |
| | | | | 1 | | | 1 | | 1 | | | N, J, K, M, O |
| | | 1 | | | | | 1 | | 1 | | | J, K, M, O, P |
| | | 1 | | | | | 1 | | 1 | | | J, K, M, O, P, |
| | EXTRA HIGH SUCTION PSI (> 100PSI) | | | | | | | | | | | N, L |

| 15 ↓ IF | NORM. SUCT. PSI | NORM. DISCH. PSI | HIGH SUPER HEAT | NORM. SUPER HEAT | LOW SUPER HEAT | LOW SUCT. PSI | HIGH SUCT. PSI | LOW DISCH. PSI | HIGH DISCH. PSI | EXTRA LOW SUPER HEAT | EXTRA HIGH SUPER HEAT | THEN DISPLAY |
|---|---|---|---|---|---|---|---|---|---|---|---|---|
| | | | | 1 | 1 | | 1 | | | | | I,G,BB,AA |
| | | | 1 | | | 1 | | 1 | | | | I,G,LR |
| | | | 1 | | | 1 | | 1 | | | | F,G,LR,AA |
| | | 1 | | | 1 | 1 | | | | | | I,BB,AA |
| | | 1 | | 1 | | 1 | | | | | | I |
| | | 1 | 1 | | | 1 | | | | | | F,LR,AA |
| | | | | 1 | 1 | | | 1 | | | | I,J,K,M,BB,AA |
| | | | 1 | | | 1 | | 1 | | | | I,J,K,M |
| | | 1 | | | 1 | | | 1 | | | | F,J,K,M,A |
| | 1 | | | 1 | | | 1 | | | | | G,BB,AA |
| | 1 | | 1 | | | | 1 | | | | | G |
| | 1 | 1 | | | | | 1 | | | | | F,G,LR |
| | 1 | 1 | | 1 | | | | | | | | BB,AA |
| | 1 | 1 | 1 | | | | | | | | | SATIS-FACTORY |
| | 1 | 1 | | 1 | | | | | | | | SATIS-FACTORY |
| | 1 | 1 | | 1 | | | | | | | | SATIS-FACTORY |
| | 1 | 1 | 1 | | | | | | | | | AA |
| | 1 | | | 1 | | | | 1 | | | | J,K,M,BB, AA |
| | 1 | | | 1 | | | | 1 | | | | J,K,M |
| | 1 | 1 | | | | | | 1 | | | | J,K,M,O |
| | | | | | 1 | | 1 | 1 | | | | G,P,L,BB, AA |
| | | | 1 | | | 1 | 1 | | | | | L |
| | | 1 | | | | 1 | 1 | | | | | L,AA |
| | | 1 | | 1 | | 1 | | | | | | BB,AA |
| | | 1 | 1 | | | 1 | | | | | | P |
| | | 1 | 1 | | | 1 | | | | | | P,AA |
| | | | 1 | | | 1 | | 1 | | | | N,J,K,M,P,AA |
| | | 1 | | | | 1 | | 1 | | | | J,K,M,O,P |
| | | 1 | | | | 1 | | 1 | | | | J,K,M,O,P ,AA |
| EXTRA HIGH SUCTION PSI ( > 100PSI) | | | | | | | | | | | | N,L |

REFRIGERATION SYSTEM ANALYZER

The present invention is directed to apparatus for automatically analyzing and indicating fault conditions in refrigeration systems—e.g., air conditioning and heat pump systems.

Throughout the following description and claims, the term "refrigeration system" is employed in a broad or generic sense to refer to any system for transporting heat through compression evaporation and condensation of a refrigerant flowing in a closed loop or path. The term "refrigeration system" thus includes air conditioning systems, heat pump systems, refrigerators, freezers, etc.

Diagnosis and repair of refrigeration systems is typically manual operation which is highly dependent upon the experience and skill of a trained technician. Under the best of circumstances, such operations are time-consuming and expensive, and minor or incipient fault conditions are often overlooked. Attempts have been made to automate the diagnostic process by providing a multiplicity of temperature and/or pressure sensors in predetermined fixed positions around the refrigerant loop and coupling the sensors to a central diagnostic computer. However, such systems are expensive to implement, and thus have only been attempted on large-scale refrigeration systems such as building air conditioning systems. Furthermore, such diagnostic systems are designed to operate in conjunction with a specific air conditioning unit, and are not compatible with air conditioning units of other manufacturers in the absence of substantial redesign of diagnostic hardware.

It is a general object of he present invention to provide apparatus for automatically diagnosing and indicating fault conditions in a refrigeration system which is compact, portable and inexpensive, which does not require a high degree of experience and skill for diagnosing and indicating (as distinguished from repairing) system fault conditions, which is adapted to operate in conjunction with a wide variety of refrigeration systems of differing models and manufacturers, and which may be employed for automatically diagnosing and indicating refrigeration system fault conditions without substantial system disassembly or inconvenience at the system site.

In accordance with the present invention, it has been recognized that a variety of fault conditions in refrigeration systems may be automatically diagnosed and indicated by inter-relating temperatures measured at preselected locations or points around the system refrigerant loop. Furthermore, it has been recognized that such temperature inter-relationship remains substantially consistent among refrigeration systems of a given type—e.g., air conditioning and heat pump systems—in a variety of sizes and provided by a variety of manufacturers. Thus, fault conditions in refrigeration systems may be automatically diagnosed and indicated in accordance with the principles of the present invention by measuring temperature at a plurality of preselected points around the system refrigerant loop, comparing such temperature readings to each other and to predetermined standard temperature relationships and ranges empirically derived and stored in memory, and indicating condition of the refrigeration system, including a multiplicity of potential fault conditions, as a function of such comparisons.

Apparatus in accordance with a preferred embodiment of the invention, having particular utility for analyzing air conditioning systems, comprises a temperature probe adapted for manual placement at each of a plurality of preselected points in turn around the refrigerant loop to provide signals indicative of temperature at each point. Apparatus electronics is coupled by a cable to the temperature probe and includes facility for reading and storing each of the probe temperature measurements in turn. Information indicative of standards and ranges of temperature data for properly operating refrigeration systems of a number of models and manufacturers is prestored in apparatus memory. The system temperature readings are compared to each other and to the prestored data to diagnose a plurality of fault conditions and to display diagnosed fault conditions to an operator.

In the preferred embodiment of the invention, the apparatus electronics is carried within an enclosure suitable for hand-holding by an operator. The enclosure is connected by a flexible cable to the temperature probe. The electronics enclosure includes a multiple-character alphanumeric display for displaying fault conditions in plain text, and an alphanumeric keypad for entering data independently of the temperature probe. A microprocessor-based controller is programmed to receive and store temperature readings in a predetermined sequence around the refrigerant loop, and indicates each reading point in turn on the display to assist the operator. Temperature readings may be taken out of sequence using the keypad. Following entry of the temperature readings. the microprocessor-based controller is responsive to a depression of an appropriate key by the operator for entering a diagnostic or evaluation mode in which the temperature readings are compared to each other and to prestored data as previously described. Condition of the air conditioning system, including any detected system faults, are indicated at the alphanumeric display for appropriate action by a repair technician.

The invention, together with additional objects, features and advantages thereof, will be best understood from the following description, the appended claims and the accompanying drawings in which:

Figure 1:
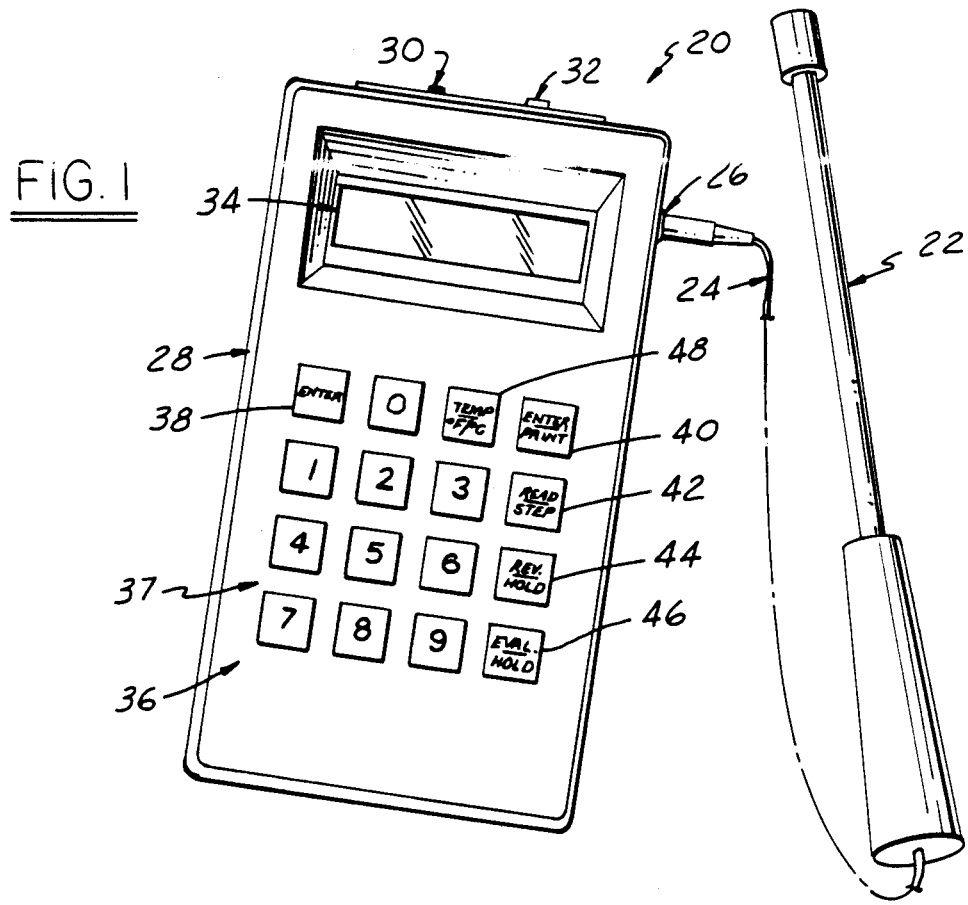
FIG. 1 is a perspective view of apparatus for automatically analyzing refrigeration systems in accordance with a presently preferred embodiment of the invention.
Figure 4A:
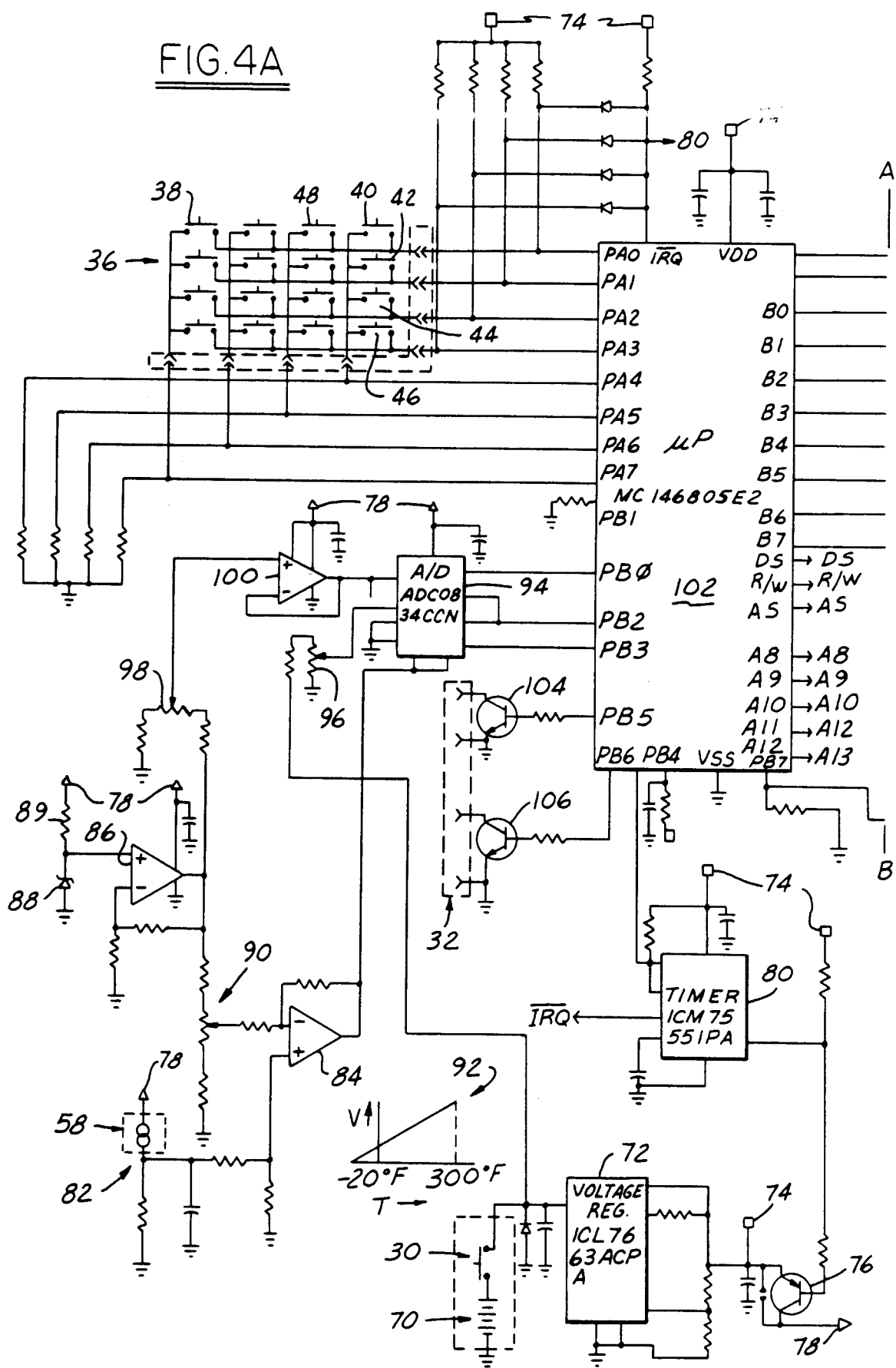
Figure 4B:
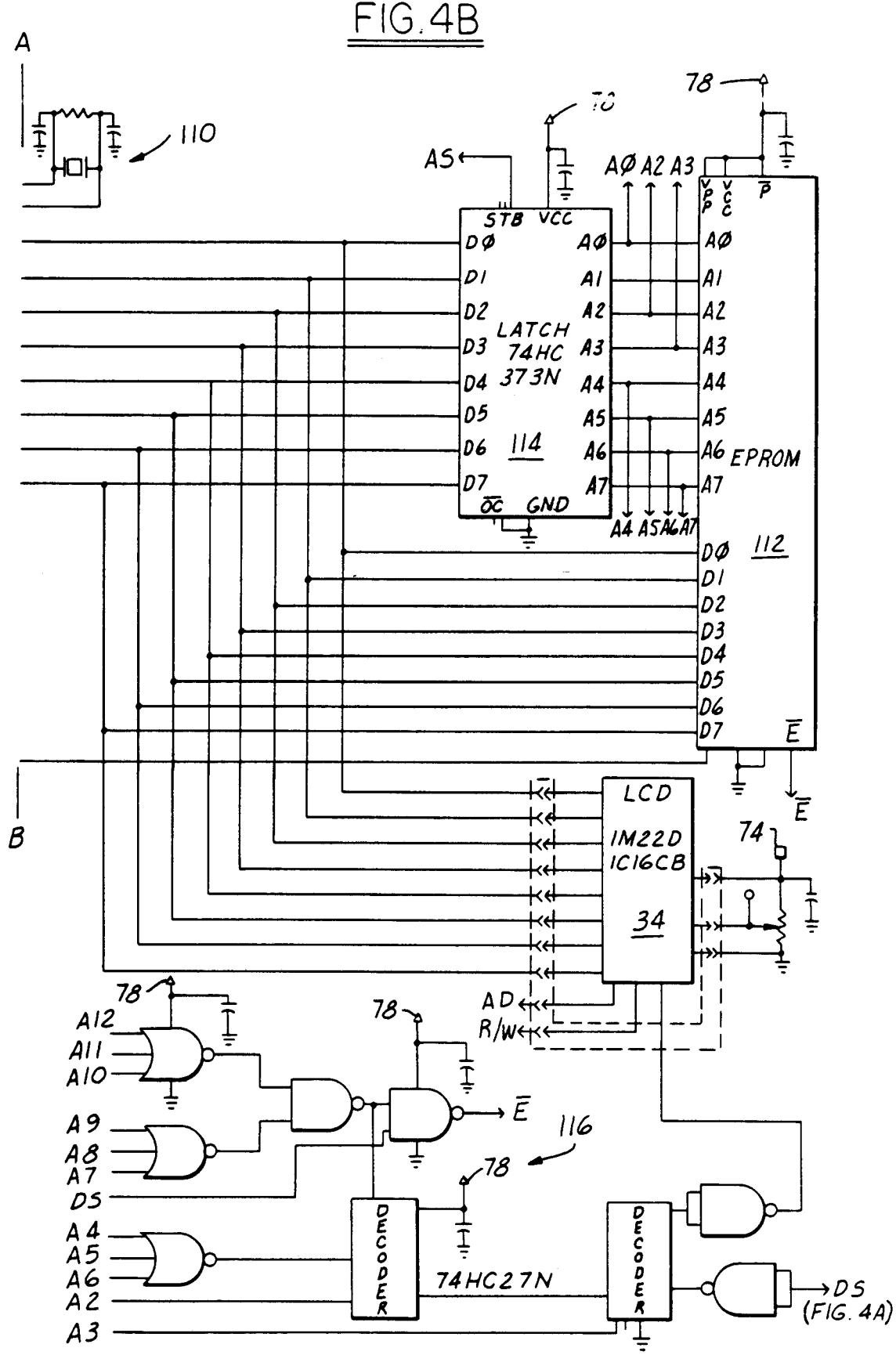
Figure 5:
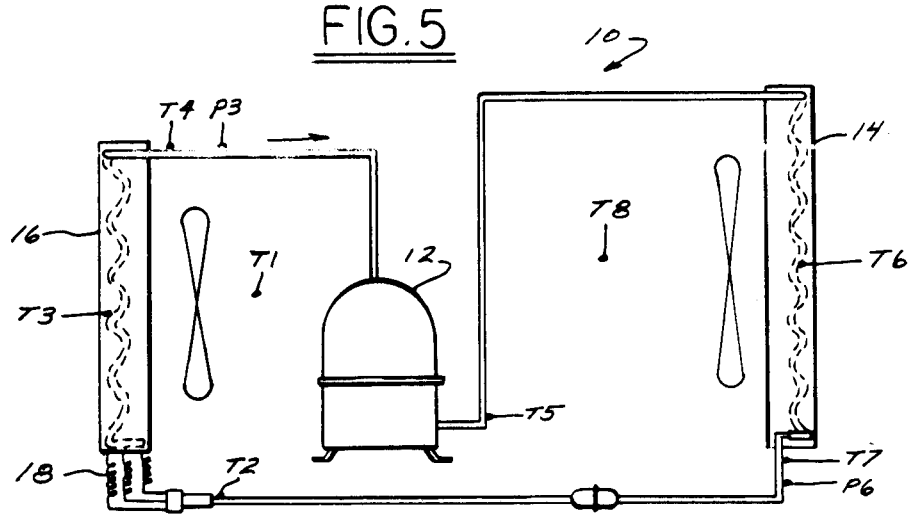
Figure 6A:
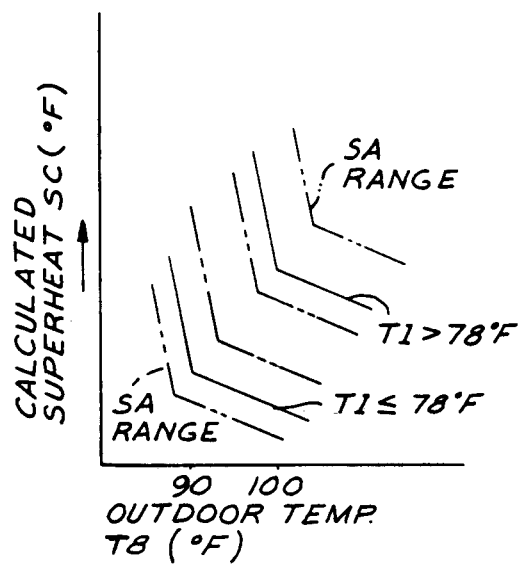
Figure 6B:
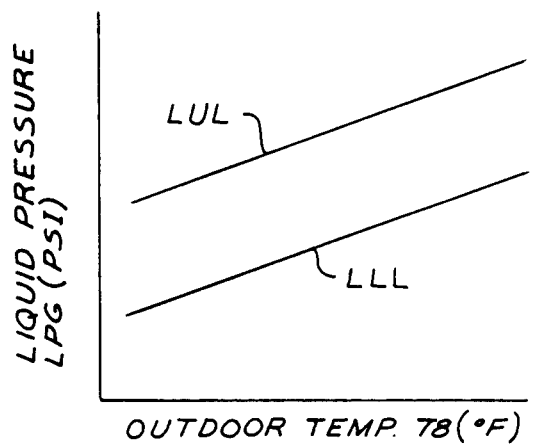
Figure 6C:
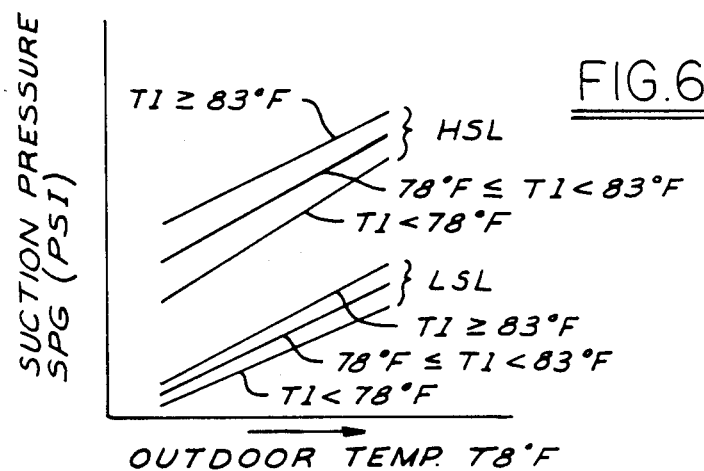
Figure 7A:
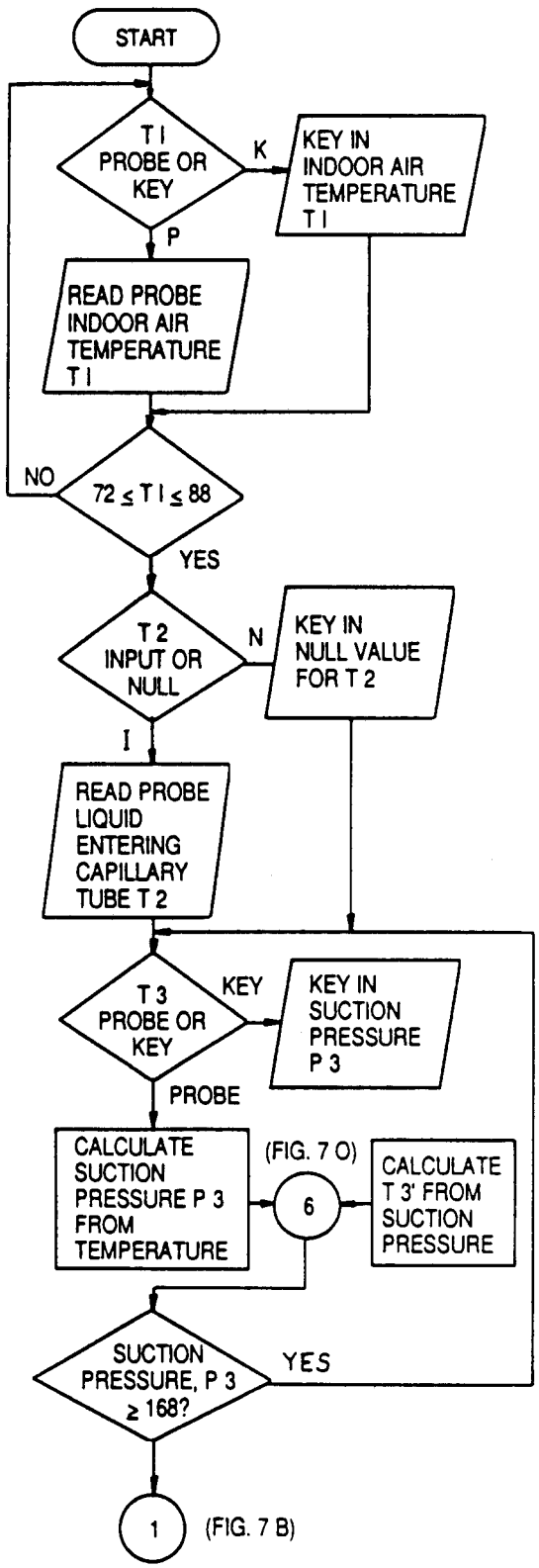

FIGS. 4A and 4B together comprise an electrical schematic diagram of electronics within the apparatus of FIG. 1, FIGS. 4A and 4B being interconnected at the line A-B in each figure;

FIG. 5 is a schematic diagram of a typical air conditioning system which may be analyzed in accordance with the principles of the present invention;

FIGS. 6A–6C are graphic illustrations of temperature inter-relationships useful in explaining principles and operation of the present invention; and FIGS. 7A–7O together comprise a flow chart illustrating operation of the invention in the data acquisition, analysis and fault-display modes of operation.

A presently preferred embodiment of the invention is disclosed hereinafter and has particular application for analysis of an air conditioning system, of which a typical example is illustrated schematically at 10 in FIG. 5. A refrigerant compressor 12, a condenser 14, capillary tubes 18 and an evaporator 16 are interconnected by appropriate conduits to form a closed refrigerant loop. The preferred embodiment of the invention herein disclosed is particularly adapted for use in conjunction with air conditioning systems which employ refrigerant R22. However, the principles of the present invention may be readily employed in conjunction with air conditioning systems which use other refrigerant types, and also in conjunction with other types of refrigeration systems—i.e., heat pumps.

A presently preferred embodiment 20 of apparatus in accordance with the invention is illustrated in FIG. 1 as comprising a temperature probe 22 coupled by a cable 24 through releasable connectors 26 to an electronics enclosure or housing 28. Housing 28 is of generally rectangular outline and is contoured to be held in one hand by an operator who may manually position probe 22 with the other hand. A power switch 30 is positioned at the top of the instrument housing adjacent to a female serial output port or connector 32 for feeding temperature and analysis data to external recording devices. An alphanumeric display 34, specifically a two-line by sixteen-character LCD in the preferred embodiment of the invention, is positioned on the housing front or top panel above an alphanumeric keypad 36.

Keypad 36 includes numeric keys "0" through "9" for entering data and selecting mode of operation. Two "Enter" keys 38,40 are positioned adjacent to opposite sides of the instrument for convenient left-hand or right-hand entry of temperature probe readings. "Enter" key 40 is also used to utput or "Print" data through connector 32. A "Read/Step" key 42 is used to step between zones or points in sequence for entry or input of temperature probe data. A "Review/Hold" key 44 permits stored temperature readings to be scrolled at display 34 through initial depression, and then held by a second depression of the switch. Depression of the "Evaluate/Hold" switch 46 initially enters the evaluation or analysis mode of operation causing sequential display of problem or fault messages as appropriate, and a second depression freezes or holds the display for consideration by the operator. A "Temperature" switch 48 permits the operator to select temperature display in degrees Fahrenheit or degrees centigrade. The internal electronics functions in degrees Fahrenheit, as will be described.

Figure 2:
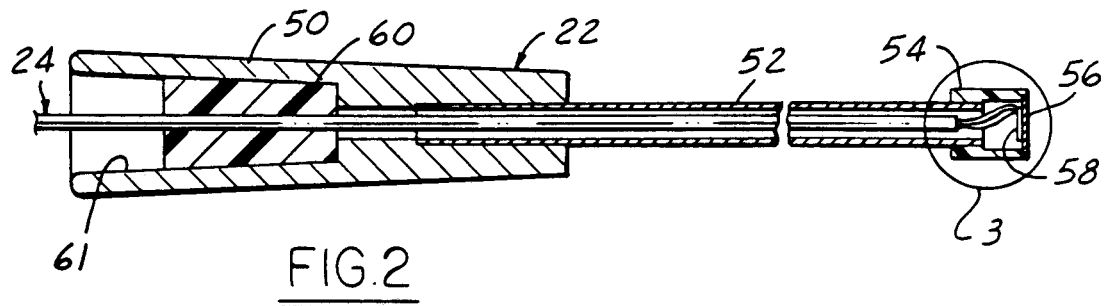
FIG. 2 is a sectional view bisecting the temperature probe of FIG. 1.
Figure 3:
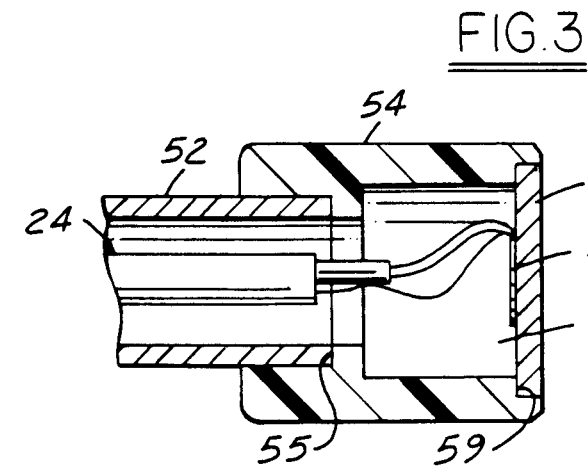
FIG. 3 is a fragmentary sectional view on an enlarged scale of that portion of the probe in FIG. 2 enclosed within the circle 3.

Temperature probe 22 is illustrated in greater detail in FIGS. 2 and 3. A handle 50 has a central throughbore in which a hollow tubular shaft 52 is sealingly captured against the shoulder 51 so as to axially and integrally project from the handle. A hollow cup-shaped probe tip 54 is sealingly affixed to the handle-remote end of shaft 52, with the shaft being seated against the shoulder 55 in tip 54. Tip 54 has a flat end wall insert 56 of heat conductive metallic construction, such as copper, at an end thereof remote from the shaft. The peripheral edge of insert 56 is sealingly affixed against a shoulder 59 at the open end of cup-shaped tip 54, which is preferably of heat-insulating construction to prevent dissipation of heat from insert 56 to shaft 52. A solid state temperature sensor 58 of conventional construction is internally affixed to insert 56 by heat conductive epoxy or the like, and is thus protectively captured within the cavity 57 formed by tip 54 while being responsive to external temperature through heat-conductive insert 56. Sensor 58 is electrically connected to conductors of cable 24 which extends through shaft 52 and handle 50 to connector 26 (FIG. 1). Epoxy 60 or other suitable means is positioned in the cavity 61 at the tip-remote end of handle 50 surrounding cable 24 for strain relief and also to prevent entry of water or other matter into temperature probe tip cavity 57 through shaft 52.

FIGS. 4A and 4B together comprise a schematic diagram of the electronics in apparatus housing 28 (FIG. 1). The solid state and integrated circuit components illustrated in FIGS. 4A and 4B are designated by standard schematic representations and/or conventional manufacturer model designation. It will be appreciated that such designations are exemplary only. Power switch 30 (FIGS. 1 and 4A) selectively feeds power from a battery 70, preferably two nine volt transistor batteries connected in parallel, to a voltage regulator 72. Voltage regulator 72 feeds regulated power to a first bus 74, and also through a transistor switch 76 to a controlled power bus 78. Switch 76 is connected to a watchdog timer 80 to disconnect power from bus 78 and all electrical components connected thereto when programming in EPROM 112 determines that processing is not required. Timer 80 thus cooperates with switch 76 to conserve battery power during standby operation without removing battery power from components coupled to bus 74.

Temperature sensor 58 (FIGS. 2-4A) is connected in a voltage divider 82 across bus 78—i.e., between bus 78 and electrical ground. The junction of divider 82 is connected to the non-inverting input of a differential amplifier 84. An amplifier 86 has an input connected to a zener diode reference 88 coupled throug hresistor 89 across bus 78, and thus provides a controlled reference voltage output. The reference output of amplifier 86 is connected through a factory-adjusted voltage divider 90 to the reference inverting input of amplifier 84. In the preferred embodiment of the invention, voltage divider 90 is factory adjusted such that amplifier 84 provides an output voltage which increases linearly with temperature in the range of −20° F. to 300° F., as illustrated schematically at 92. The output of amplifier 84 is connected to one signal input of an a/d converter/multiplexer 94, which receives a second signal input from a factory-adjusted voltage divider 96 connected directly across battery power for indicating battery voltage level. A third signal input to converter 94 is fed from reference voltage amplifier 86 through a factory-adjusted voltage divider 98 and a unity gain amplifier 100.

A control microprocessor 102 ahs I/O ports PBO, PB2 and PB3 coupled to a/d converter/multiplexer 94 for selectively receiving signals from temperature sensor 58 and battery power divider 96. When the signal input to converter 94 from amplifier 84 exceeds the reference input from amplifier 100, converter 94 is controlled by microprocessor 102 to subtract the reference input from the temperature input, and thereby extend the microprocessor temperature input range to the upper 300° F. limit of amplifier 84. I/O ports PB5 and PB6 of microprocessor 102 are respectively connected through the transistor buffers 104, 106 to output terminals at connector 32 for feeding clock and data signals to an external recording device, such as a data logger/printer. Input ports PA0 through PA7 are connected in the usual manner to keyboard 36 for receiving keystroke command and data information therefrom. Keyboard 36 is also connected to the interrupt request input terminal $\overline{IRQ}$ of microprocessor 102 and to watchdog timer 80 for signaling an interrupt request upon depression of a key, and at the same time reapplying power from standby operation if required. The clock input to timer 80 is fed from I/O port PB4 of microprocessor 102. Microprocessor 102 is coupled to the usual ceramic resonator clock 110 (FIG. 4B). An EPROM 112 (FIG. 4B) has programming prestored therein for controlling operation in the manner to be described, and also has prestored data relating temperature readings and temperature ranges to each other. A memory address latch 114 has address and data terminals coupled in the usual manner to address and data terminals of microprocessor 102 and EPROM 112. The address outputs A0–A7 of latch 114 and the address outputs A8–A12 of microprocessor 102 are also coupled through decoder logic 116 to control internal memory of display 34 which is memory mapped with EPROM 112.

In an initial or data acquisition mode of operation (FIGS. 7A–7C), points at which temperature readings are to be taken are indicated in sequence at display 34. The operator proceeds to the indicated point or zone and places probe tip insert 56 at a position for reading temperature. In the preferred embodiment of the invention, eight temperature readings T1 through T8 are taken at the eight zones or points so identified in FIG. 5: T1 - indoor ambient; T2 - refrigerant temperature at input to capillary tubes 18 (or expansion valve); T3 - refrigerant temperature at midpoint of evaporator 16; T4 - refrigerant temperature at evaporator output to suction side of compressor 12; T5 - refrigerant temperature at output of compressor 12; T6 - refrigerant temperature at midpoint of condensor 14; T7 - refrigerant temperature at condenser output; and T8 - outdoor ambient. As will be described, pressure readings P3, P6 may be entered through keypad 36 in place of temperature readings T3, T6. Temperatures T1 and T8 may be entered through keypad 36. Partial analysis may be coupled without readings T2, T5 and T7. However, temperature T4 must be read through probe 22.

Refrigerant temperatures are measured by placing probe tip insert 56 in that conductive contact with the refrigerant conduit. When measured temperature indicated at display 34 has stabilized, the operator depresses one of the "Enter" keys 38, 40 and the corresponding temperatur reading is sampled and stored in microprocessor 102. This process continues for each preselected temperature zone or point in turn. If a substantial time elapses between readings, watchdog timer 80 is controlled by port PB4 to remove power from sensor 58, and other components in FIGS. 4A and 4B, and thereby conserve battery power until a key is depressed at which point power is reapplied. However, data previously stored in microprocessor 102 is not lost. Following the data acquisition mode of operation, the operator may enter the evaluation mode (FIGS. 7D–7L and 7O) by depresion of key 46. Prestored temperature data is automatically analyzed, followed by a condition display mode (FIGS. 7M and 7N, Table) during which any fault conditions of the analyzed refrigeration system are indicated in plain text at display 34. Microprocessor 102 samples battery voltage level at divider 96 through converter 94 on power-up, and indicates low battery power at display 34 when warranted.

Operation of the invention will be described in detail in conjunction with FIGS. 7A–7O, which collectively comprise a flow chart illustrating operation of software prestored in EPROM 112 (FIG. 4B). Referring first to FIG. 7A, following application of battery power, and with air conditioning system 10 (FIG. 5) in stable operation, the operator must first enter temperature T1 at the first point or zone in the refrigerant loop—i.e., indoor air temperature or ambient temperature surrounding evaporator 16 (FIG. 5). This temperature may be entered either by positioning the probe so as to measure indoor air temperature, waiting for measured temperature indicated at display 34 (FIG. 1) to stabilize and then depressing either of the "Enter" keys 38–40, or by keying in otherwise measured air temperature through numeric keys 37 and "Enter" key 38 or 40. In either event, temperature T1 must be between 72° and 88° F. to continue operation. Temperature T2 of refrigerant entering capillary tubes 18 (FIG. 5) is then entered using temperature probe 22, or in the event that such temperature cannot be measured because of inaccessability or other reasons, a null value is manually entered through keyboard 28. Temperature T3 at the midpoint of evaporator 16 (FIG. 5) is then called for or prompted at display 34, and is entered by the operator by placing probe tip 54 against the evaporator tubing such that insert 56 contacts the tubing and conducts heat therethrough until sensor 58 stabilizes at the temperature of the evaporator midpoint. At this point, one of the "Enter" keys 38, 40 can be depressed. If the evaporator midpoint temperature cannot be read, the operator may key in suction pressure P3 (FIG. 5) at the output of evaporator 16, which may be read from a gage or the like prepositioned at the evaporator output. Depending upon whether temperature T3 or pressure P3 is entered, the opposing parameter is then calculated, for the purpose of which operation is transferred to the subroutine illustrated in FIG. 7D.

Figure 7B:
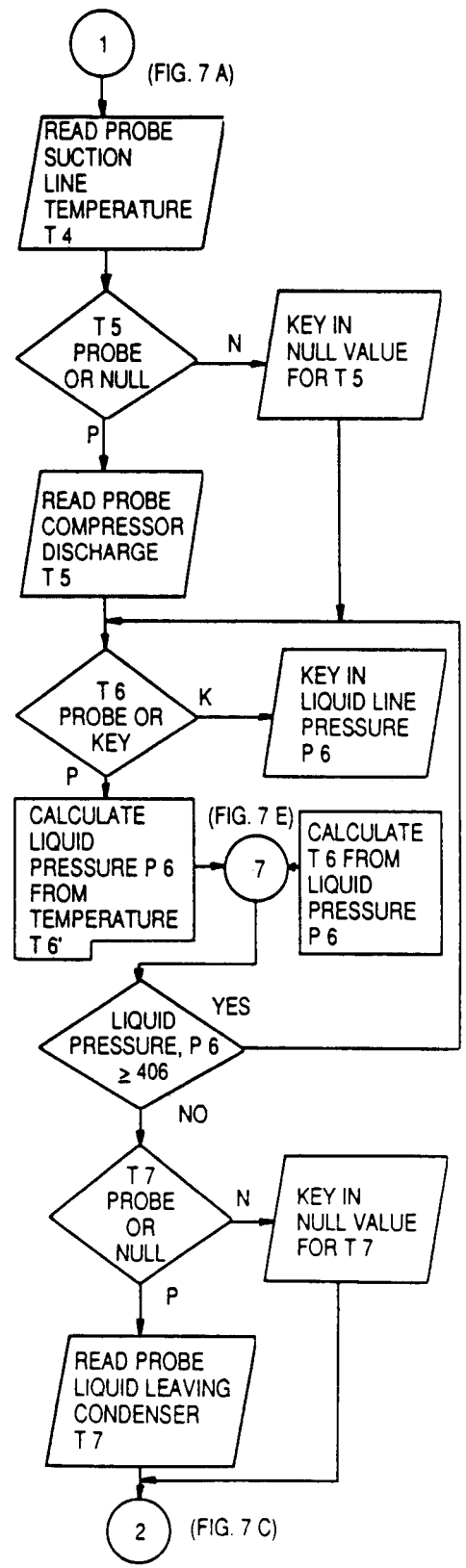
Figure 7C:
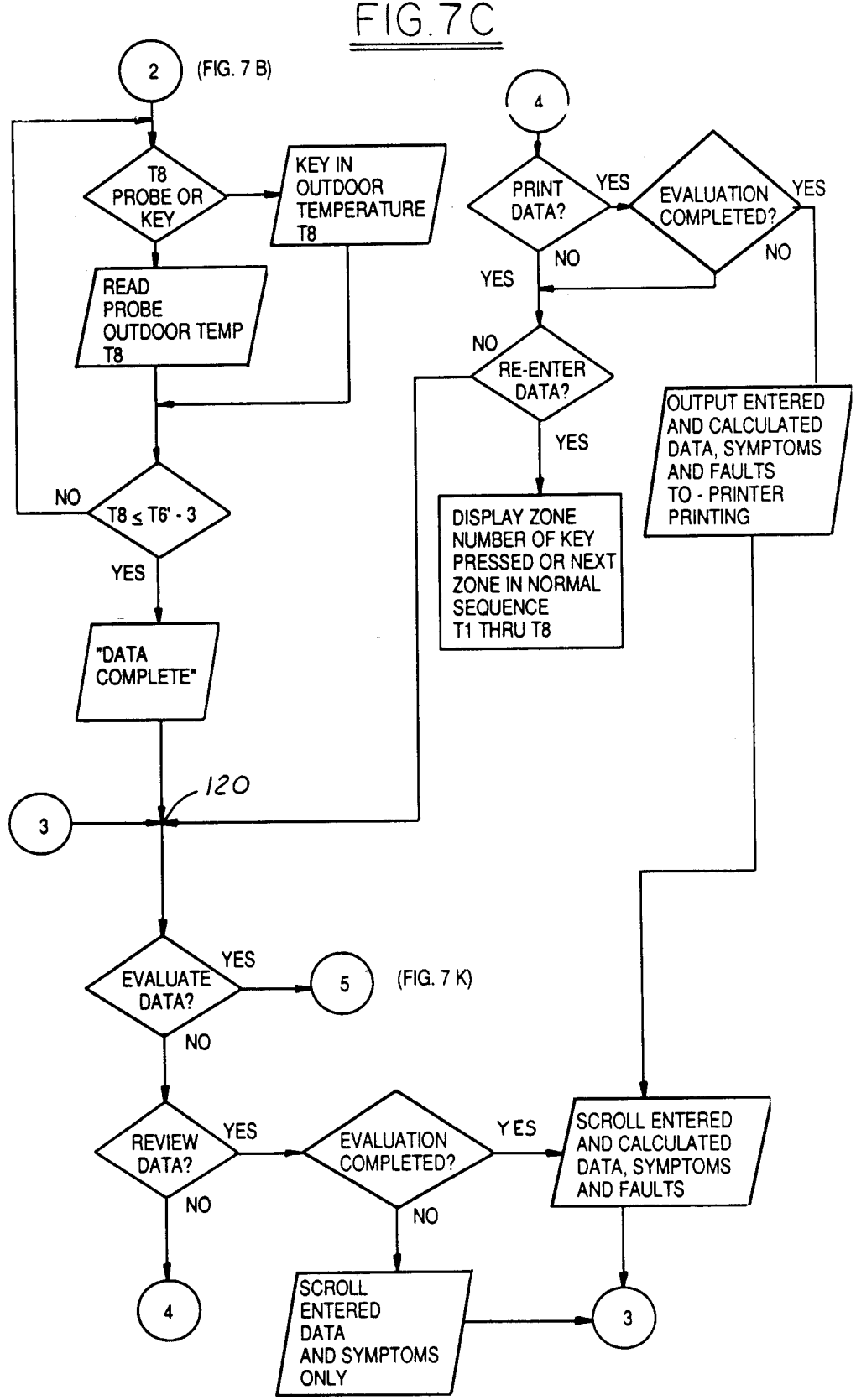
Figure 7D:
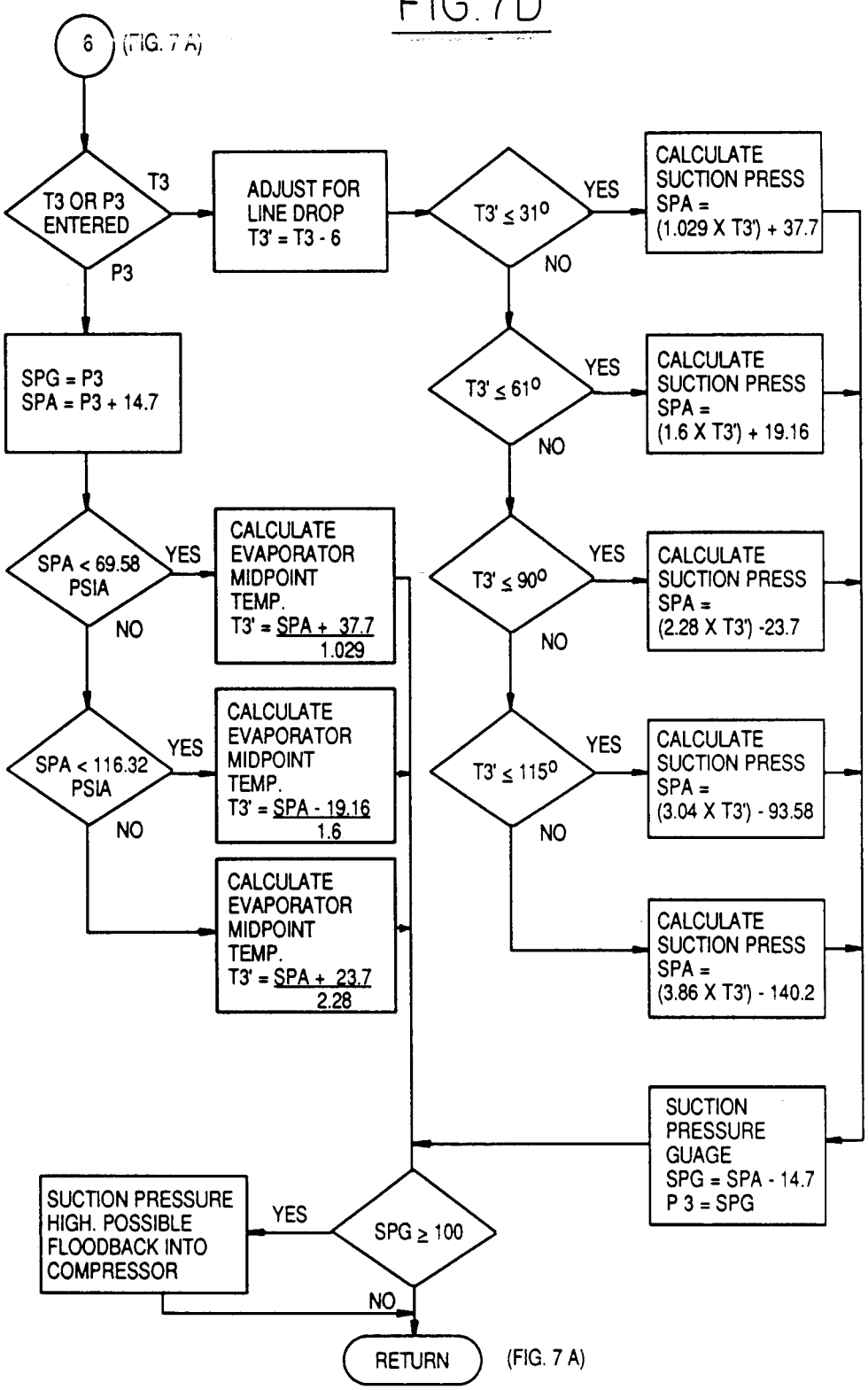

Referring to FIG. 7D, if suction pressure P3 had been entered by the operator, gage suction pressure SPG is set equal to such entered pressure P3, and absolute suction pressure SPA is set equal to P3 plus atmospheric pressure 14.7 lbs./in.$^2$. Absolute suction pressure SPA is then compared with the thresholds 69.58 psia and 116.32 psia, and depending upon the result, a calculated evaporator midpoint pressure T3' is obtained according to the relationships illustrated in FIG. 7D. It will be appreciated that these and other temperature and pressure inter-relationships illustrated in the drawings and described hereinafter have been derived empirically through study of numerous air conditioning system operating parameters and allowable ranges. If measured temperature T3 had been entered by the operator using temperatur probe 32, an adjusted temperature T3' is obtained by subtracting six degrees from measured temperature T3, and adjusted temperature T3' is then compared with a number of thresholds. Depending upon the value of adjusted temperature T3', absolute suction pressure SPA and gage suction pressure SPG are calculated. If gage suction pressure SPG determined by either method in FIG. 7D is greater than or equal to 100 psi, possible floodback into compressor 12 is noted, and operation otherwise returns to the main routine of FIG. 7A. Measured of calculated suction pressure P3 is then compared in FIG. 7A with the threshold of 168 psi. If this threshold is exceeded, an erroneous reading is indicated at display 34 (FIG. 1) and measurement of temperature T3 or entry of suction pressure P3 must be repeated. Otherwise, operation continues to FIG. 7B.

As a next step in operation, compressor suction line temperature T4 at the output of evaporator 16 must be measured using temperature probe 22. No corresponding keypad parameter entry can be substituted for temperature measurement through the probe and entry of the temperature reading through key 38 or 40. Temperature T5 at the output of compressor 12 (FIG. 5) is then measured or, if such temperature reading cannot be obtained, a null value is entered through keypad 36. Temperature T6 at the midpoint of condense 14 (FIG. 5) is then entered through probe 22 and keypad 36, or condenser discharge pressure P6 is read at a prepositioned gage and entered through keypad 36. In either case, operation then transfers to the subroutine illustrated in FIG. 7E for calculation of temperature T6 from entered pressure P6 of for calculation of pressure P6 from measured temperature T6.

Figure 7E:
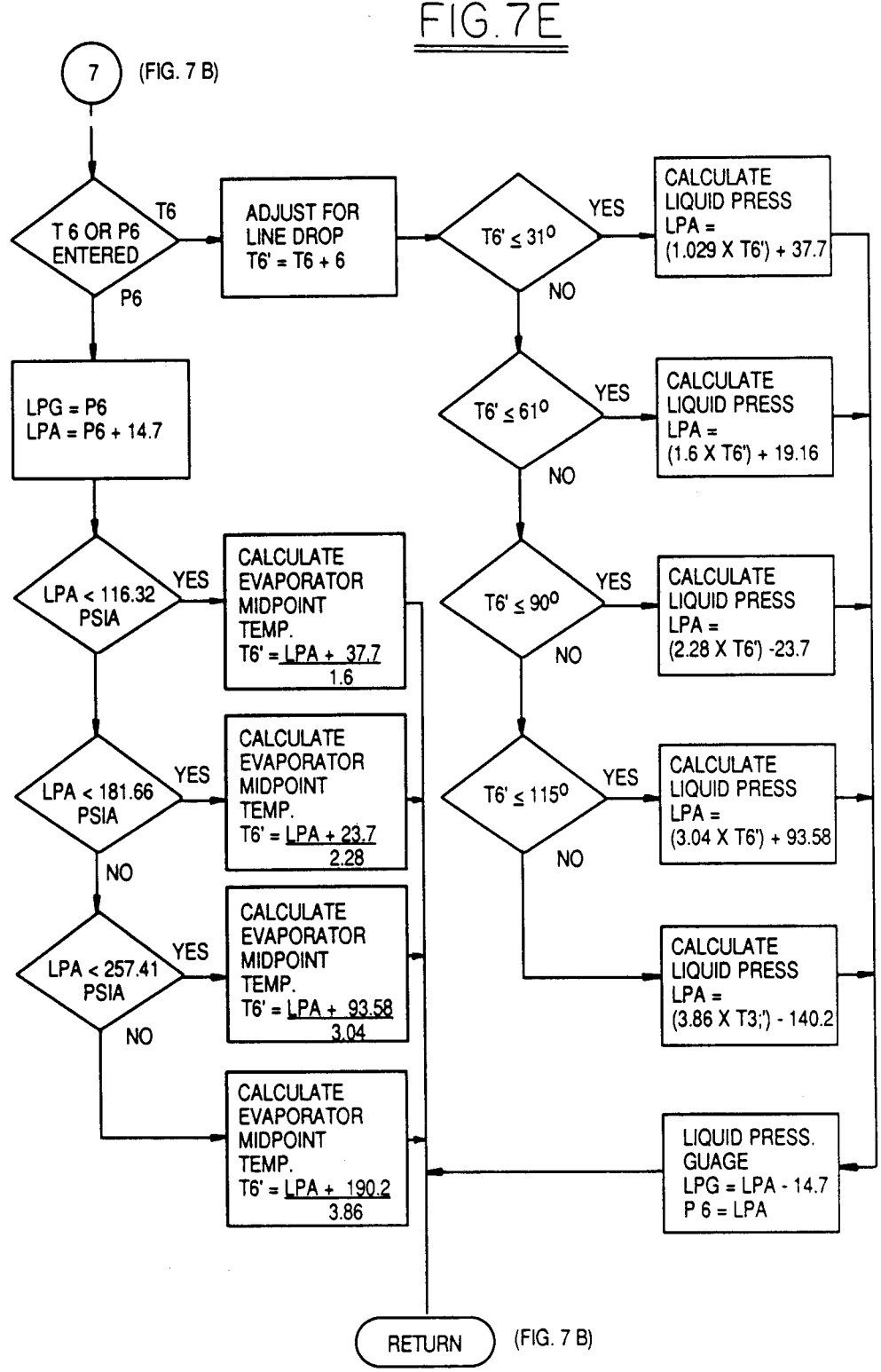

Referring to FIG. 7E, if pressure P6 was entered by the operator through keypad 36, gage line pressure LPG is set equal to entered pressure P6, and absolute line pressure LPA is then set equal to entered pressure P6 plus atmospheric pressure. Absolute line pressure LPA is then compared to various thresholds, and evaporator midpoint temperature T6' is calculated as a function of line pressure LPA according to the relationships illustrated in FIG. 7E depending upon the threshold value of pressure LPA. On the other hand, if temperature T6 was measured using probe 22, a modified temperature T6' is first obtained and then compared with various thresholds, and pressure LPA is calculated from temperature T6' as a function of the relationships illustrated in FIG. 7E depending upon the threshold value of temperature T6'. Gage liquid pressure LPG is then calculated by subtracting atmospheric pressure from pressure P6 and operation is returned to FIG. 7B. If entered or calculated liquid pressure P6 exceeds 406 psi, an invalid reading is indicated in FIG. 7B and the operator is prompted to reenter temperature T6 or pressure P6. Otherwise, temperature T7, which is obtained to the output of condenser 14 (FIG. 5) is called for, and the operator may either measure and enter the temperature reading using probe 22, or enter a null value if the temperature reading cannot be obtained. Operation then continues per FIG. 7C.

Referring to FIG. 7C, outdoor temperature T8—i.e., temperature of ambient surrounding condenser 14 (FIG. 5)—is then entered either using probe 22 (FIG. 1) or numeric keys 37. In either event, outdoor temperature T8 must be less than condenser midpoint temperature T6' minus 3° F., or an invalid outdoor temperature reading is indicated and must be re-entered. If temperature T8 is deemed a valid reading, the legend "Data Complete" is displayed at LCD 34, and the operator has the choice of proceeding immediately with evaluation of the data (FIG. 7K), reviewing the data, or printing the data at a printer coupled to connector 32 (FIG. 1). Assuming that the operator wishes to review the data prior to evaluation, "Rev./Hold" key 44 is depressed. Each temperature T1–T8 or pressure P3 and P6 is displayed in turn and in sequence at LCD 34. Null values are displayed as "N.A.". If the operator wishes to hold a reading at display 34, he may again depress key switch 44. When review is completed, operation then returns to the evaluate/review/print/ decision point 120 (FIG. 7C) where the operator may enter the evaluation mode by depression of switch 46, re-review data by depression of switch 44, or select a print operation by depression of switch 40. If the operator selectes a print operation but the data has not yet been evaluated, he is asked whether data is to be re-entered. Printing of data is not permitted unless evaluation has been completed. If evaluation has been completed, entered and calculated data, symptoms and faults are fed through connector 32 to the printing device and display 34 indicates "PRITING". Operation then returns to evaluate/review/print decision point 120. Assuming now that the operator wishes to evaluate data, operation transfers to FIG. 7K.

Figure 7G:
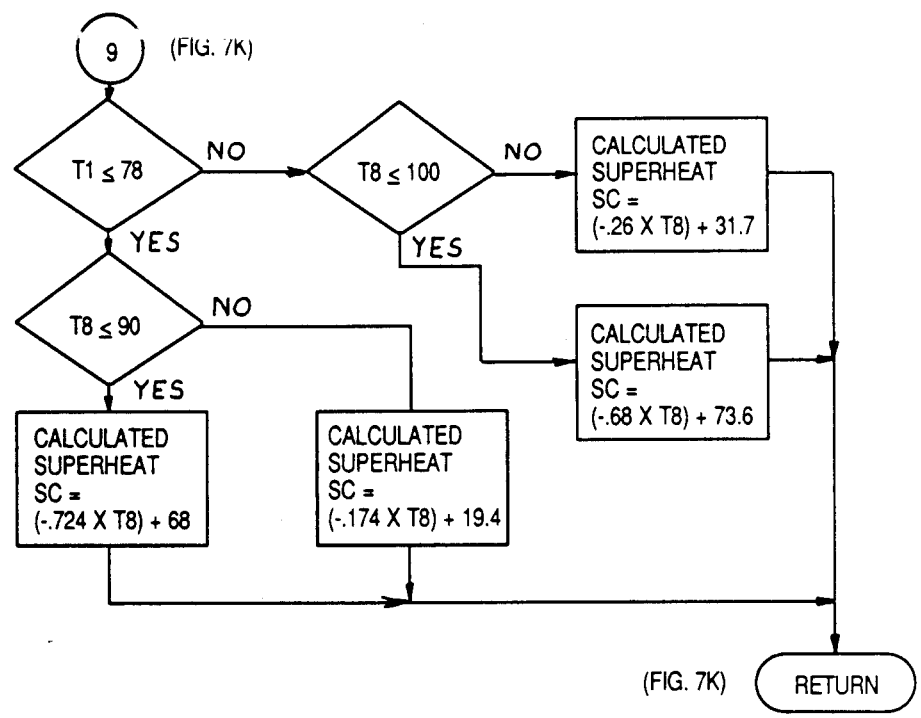
Figure 7H:
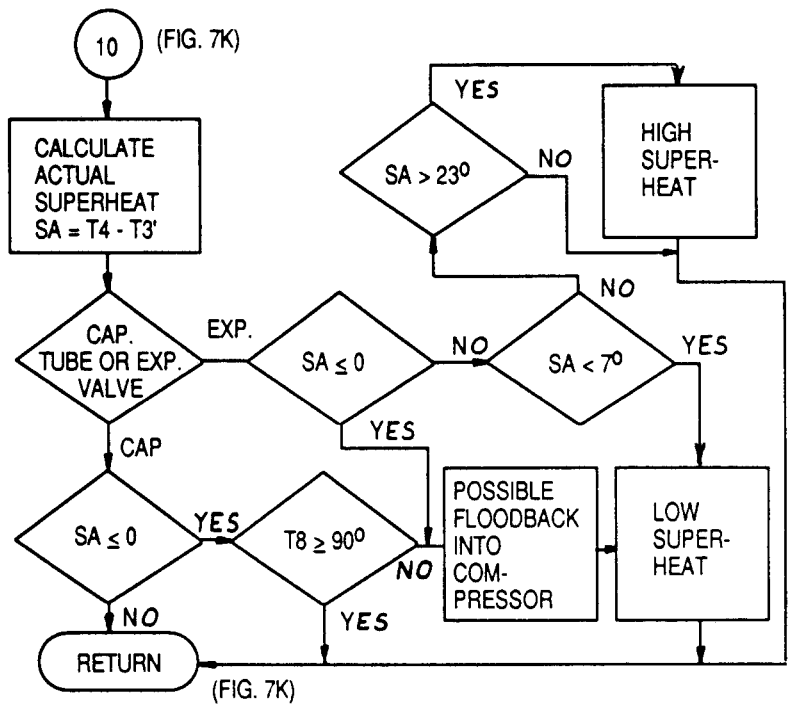
Figure 7K:
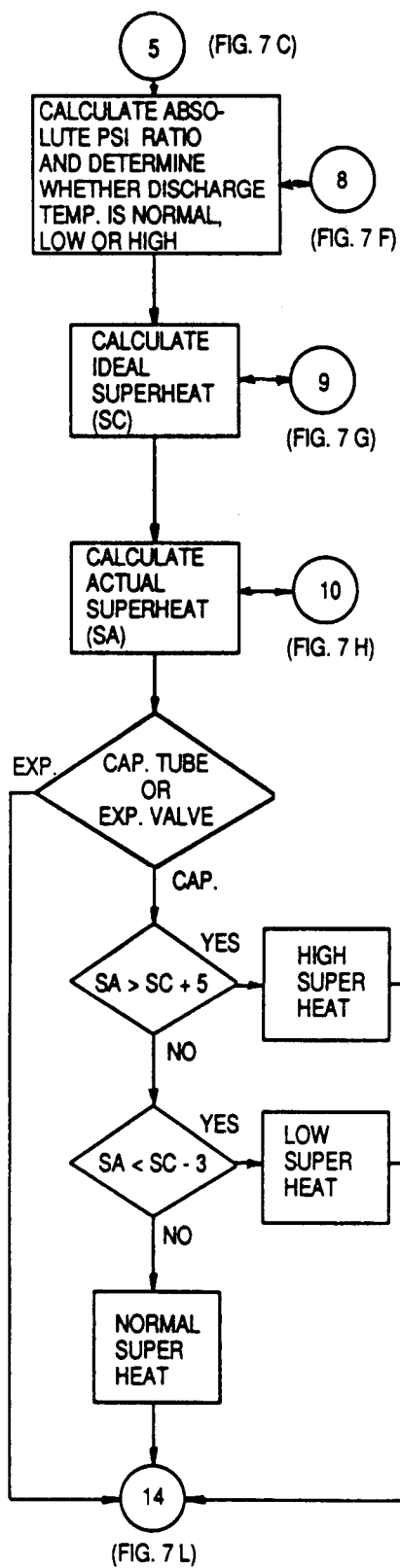
Figure 7L:
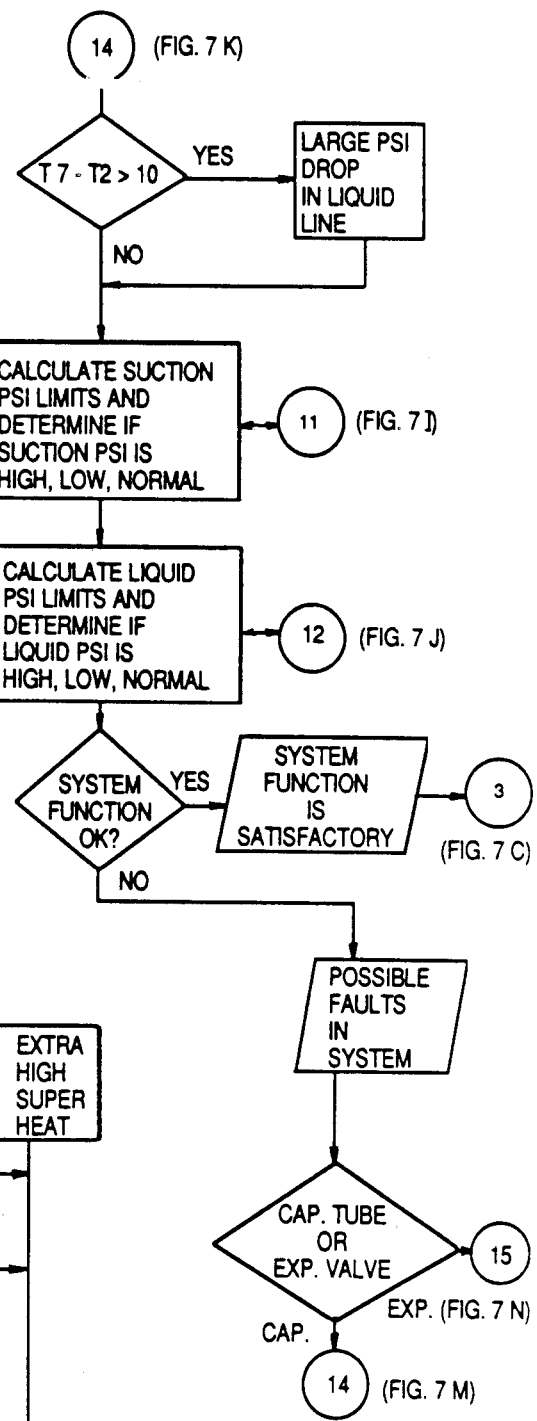

In evaluation of data per the routine illustrated in FIGS. 7K and 7L, absolute pressure ratio APR must first be calculated and compressor discharge temperature T5 (if entered) compared to threshold limits, for the purpose of which operation is transferred to the subroutine of FIG. 7F. Absolute pressure ratio APR is first determined as a function of absolute liquid pressure LPA divided by absolute suction pressure SPA. A calculated compressor discharge temperature CDTC is then determined as a function of absolute pressure ratio, and actual compressor discharge temperature T5' is determined as a function of measured discharge temperature T5. If a null value was entered for T5, operation is terminated since no comparison can be made. Program operation returns to the main evaluation routine of FIG. 7K. Low compressor discharge temperature limit LDL and high compressor discharge temperature limit HDL are then calculated as a function of outdoor temperature T8, and actual compressor discharge temperature T5' is compared with low and high compressor discharge limits. If actual compressor discharge temperature T5' is less than low limit LDL, low discharge temperature and possible floodback into the compressor are indicated. If temperature T5' is greater than high limit HDL, a high discharge temperature is indicated. If temperature T5' is between limits LDL and HDL, compressor discharge temperature is deemed normal. In any event, operation is then returned to the main evaluation routine of FIG. 7K.

Ideal superheat SC is then calculated in FIG. 7K, for the purpose of which operation transfers to the ideal superheat calculation subroutine of FIG. 7G. Referring to FIG. 7G, indoor temperature T1 is first compared with a threshold value of 78° F. Depending upon the level of indoor temperature T1, outdoor temperature T8 is then compared with threshold levels of 90° and 100° F. Depending upon these comparisons, calculated superheat SC is then determined as a function of outdoor temperature T8 according to the relationships illustrated in FIG. 7G. As illustrated graphically in FIG. 6A, superheat SC is thus calculated as a function of outdoor temperature T8, which function depends upon indoor temperature T1. The two curves in FIG. 6A are straight-line approximations of curves coupled from wide variety of air conditioning systems as previously described The curve for T1>78° F. has a knee at T8=100° F., while the curve for T1≦78° F. has a knee at T8=90° F. Operation is returned to the main evaluation routine of FIG. 7K.

Actual superheat SA, as distinguished from ideal superheat SC, is then calculated in FIG. 7G, for the purpose of which operation branches to the actual superheat calculation subroutine of FIG. 7H. Actual superheat SA is calculated as a function of evaporator output temperature T4 minus calculated or adjusted evaporator midpoint temperature T3' (FIG. 7D). Depending upon whether the refrigeration system is a capillary or expansion-type system, calculated actual superheat SA is then compared with the threshold level of 0° F. In a capillary system, if actual superheat SA is greater than 0° F. or the outside temperature is greater than 90° F., no problem is indicated and operation returns to the primary evaluation routine of FIG. 7K.

On the other hand, In FIG. 7H where actual superheat SA is less than 0° F. in either an expansion or capillary system, and outside temperature T8 is less than 90° F. in a capillary system, possible floodback into the compressor and low superheat are indicated. In an expansion system where superheat SA is not less than 0° F., a superheat of less than 7° F. indicates a low superheat, while a superheat SA greater than 23° F. indicates a high superheat. In any event, operation is returned to the primary evaluation routine of FIG. 7K. In an expansion valve-type air conditioning system, the evaluation operation branches from FIG. 7K and continues in the routine of FIG. 7L. However, in a capillary system of the type illustrated in FIG. 5, actual superheat SA is compared in FIG. 7K with calculated superheat SC. It has been found that, for most if not all air conditioning systems, actual superheat SA may be up to 5° greater than calculated superheat SC, or up to 3° less than calculated superheat SC, and proper operation will be maintained. Thus, in effect, each of the curves in FIG. 6A is with a range of $+5°$ and $-3°$ into which SA may fall and still indicate proper operation. These ranges for superheat SA are illustrated fragmentarily in FIG. 6A. Excess actual superheat SA indicates either a high or extra high superheat level depending upon the differential. On the other hand, deficient actual superheat SA indicates either a low or extra low superheat level. If $SC-3 \leq SA \leq SC+5$, normal superheat is indicated. Evaluation then continues per FIG. 7L.

Condenser discharge temperature T7, if measured, is first compared to capillary tube input temperature T2, if measured, to indicate a high pressure drop in the liquid line which connects the condenser output to the capillary tube input. Next, suction pressure limit parameters are calculated and evaluated, for the purpose of which operation branches to the subroutine of FIG. 7I. Indoor temperature T1 in FIG. 7I is first compared with the limits of 78° F. and 83° F., and then low suction limit LSL and high suction limit HSL are calculated as a function of outdoor temperature T8 according to the expressions in FIG. 7I depending upon the level of indoor temperature T1. These expressions are also illustrated graphically in FIG. C, which once again represent straight-line approximations of pressure/temperature relationship limits HSL, LSL that hold throughout the air conditioning industry. Suction pressure limits HSL and LSL vary with indoor temperature T1. For a given value of outdoor temperature T8, gage suction pressure SPG must fall between the limits HSL and LSL determined by indoor temperature T1. If gage suction pressure SPG for a given temperature T8 is less than the calculated low suction limit LSL set by the temperature T1, low suction pressure at the output of evaporator 16 (FIG. 5) is indicated. On the other hand, if gage suction pressure SPG is higher than the high suction limit HSL, a high suction pressure is indicated. If SPG is between limits LSL and HSL, normal suction pressure is indicated. In any event, operation returns to and continues in the evaluation routine of FIG. 7L.

Liquid pressure limits in the line between condenser 14 and evaporator 16 (FIG. 5) are then calculated and evaluated, for the purpose of which operation branches to the subroutine of FIG. 7J. A lower liquid pressure limit LLL and an upper liquid pressure limit LUL are first calculated as a function of outdoor temperature T8 according to the expressions given in FIG. 7J. These functions are also illustrated in FIG. 6B, and once again represent straight-line approximations of pressure/temperature relationships which hold throughout the air conditioning industry. If the gage liquid pressure LPG is less than the lower liquid limit LLL, a low liquid pressure is indicated. On the other hand, if gage liquid pressure LPG is greater than the upper liquid pressure limit LUL, a high liquid pressure is indicated. If gate liquid pressure LPG is between limits LLL and LUL (FIG. 6B) for a given value of temperature T8, normal liquid pressure is indicated. In any event, operation then returns to the main evaluation routine of FIG. 7L. IF no fault conditions have been indicated during the evaluation mode of operation as previously described, system function is considered satisfactory and operation returns to decision point 120 of FIG. 7C. If possible faults have been indicated, however, operation continues with sequential display of possible fault conditions, depending upon whether the system is a capillary or expansion type, per the tables of FIG. 7M and 7N respectively. Following is a Table of fault messages per the message display letters along the right-hand edges of FIG. 7M and 7N.

| FAULT MESSAGE TABLE | |
|---|---|
| Message Codes (FIGS. 7M & 7N) | Display Message |
| F | Refrigerant Undercharge |
| G | Outdoor Temperature is less than measured value |
| H | Restricted Capillary Tubes |
| I | Low Evaporator Air Flow |
| J | Low Condenser Air Flow |
| K | Condenser Air Recirculation |
| L | Check Compressor |
| M | Outdoor Temperature is greater than measured value |
| N | Refrigerant Overcharged |
| O | Air in System Refrigerant |
| P | High Evaporator Air Flow |
| AA | Expansion Value Bad or Poor Adjustment |
| BB | Expansion Value Bulb Poor Contact |
| LR | Liquid Line Restriction |

Where multiple fault messages are to be displayed, they are scrolled in the order illustrated in FIGS. 7M and 7N. In the case of an expansion valve refrigeration system, and following display of fault messages per FIG. 7N, operation returns to decision point 120 of FIG. 7C. On the other hand, in the case of a capillary tube-type air conditioning system of the type illustrated in FIG. 5, following display of fault messages per FIG. 7M operation continues to the routine of FIG. 7O. If display message H indicating restricted capillary tubes was indicated, and either condenser output temperature T7 or capillary tube input temperature T2 was entered as a null value through the keyboard, a liquid line restriction fault message code LR (Table) is displayed at LCD 34, and operation returns to decision point 120 of FIG. 7C. If both condenser output and capillary tube input temperatures T7 and T2 were read from the temperature probe, the temperatures are compared, and excess temperature drop results in a liquid line restriction fault message.

A complete software listing in 6800 machine code for operation of the preferred embodiment 20 as hereinabove described accompanies this application as an Appendix hereto.

As indicated above, the principles of the present invention have been disclosed in conjunction with a presently preferred embodiment thereof for use in analysis of air conditioning systems which employ R22 refrigerant. However, the invention may be readily employed in conjunction with air conditioning systems having other types of refrigerant by replacing EPROM 112 with one having suitable parameters and algorithms prestored therein. Likewise, the invention may be implemented in conjunction with analysis of heat pumps, for example, by replacing EPROM 112 with another EPROM having new or additional algorithms for such systems.

The invention claimed is:

1. Apparatus for automatically analyzing a refrigeration system of the type which includes a compressor, condenser and evaporator means having inputs and outputs interconnected by conduit means in a refrigerant loop, said apparatus comprising:
   means for reading temperature at a plurality of preselected points around said loop,
   means for comparing said temperature readings to each other and to predetermined standards, and for diagnosing a pluarlity of fault conditions as a function of such comparisons,
   means for displaying diagnosed fault condition,
   a temperature probe constructed for manual placement at each of said preselected points in turn, and
   an electronics and display package including said reading means, means for selectively storing each of said temperature readings in turn, said comparing means and said displaying means.

2. The apparatus set forth in claim 1 wherein said temperature-reading means includes means for reading ambient temperature at at least one of said evaporator and condenser means.

3. The apparatus set forth in claim 1 wherein said package further includes means coupled to said displaying means for indicating said points at which temperature readings are to be taken in a predetermined sequence.

4. The apparatus set forth in claim 3 wherein said package further comprises means for selectively obtaining said temperture readings in other than said preselected sequence.

5. The apparatus set forth in claim 4 wherein said package further comprises means for selectiely entering and storing data independently of said probe.

6. The apparatus set forth in claim 5 wherein said data entry means comprises an alphanumeric keypad carried by said package.

7. The apparatus set forth in claim 6 wherein said display means comprises alphanumeric display means for indicating conditions of said refrigeration system in plain text.

8. The apparatus set forth in claim 7 wherein said package is of manual portable construction and includes battery means for supplying electrical power for said package.

9. The apparatus set forth in claim 8 wherein said reading, storing and comparing means collectively include microprocessor-based control means, and read-only-memory means having control, evaluation and display programming for said control means prestored therein.

10. The apparatus set forth in claim 9 further comprising means responsive to absence of operation at said control means for identifying a standby mode of operation and removing battery power from at least some of said control means including said display means.

11. The apparatus set forth in claim 10 further comprising means responsive to depression of a key at said keypad for exiting said standby mode of operation and reapplying battery power to all of said control means.

12. The apparatus set forth in claim 1 wherein said preselected points include ambient temperatures at said evaporator and condenser means, and evaporator output refrigerant temperature.

13. The apparatus set forth in claim 12 wherein said system further includes capillary means at said input to said evaporator means, and whereinsaid preselected points further include temperature of refrigerant entering said capillary means, midpoint refrigerant temperature at said evaporator means, refrigerant discharge temperature at said compressor means, and midpoint and output refrigerant temperatures at said condenser means.

14. The apparatus set forth in claim 1 further comprising means for selectively entering and storing discharge pressure at said evaporator and condenser means.

15. The apparatus set forth in claim 1 wherein said reading, storing and comparing means collectively include microprocessor-based control means, and read-only-memory means having control, evaluation and display programming for said control means prestored therein.

16. The apparatus set forth in claim 15 wherein said probe comprises a temperature sensor for providing an electronic signal as a function of temperature, and wherein said reading means comprises input means coupled to said sensor for providing an analog signal which varies as a linear function of temperature over a preselected temperature range.

17. The apparatus set forth in claim 16 wherein said preselected temperature range includes the range from $-20°$ F. to $300°$ F.

18. The apparatus set forth in claim 16 wherein said package is of manual portable construction and includes battery means for supplying electrical power for said package.

19. The apparatus set forth in claim 18 further comprising means coupled to said battery means for indicating battery voltage level, and means responsive to said level-indicating means for indicating low battery voltage at said displaying means.

20. The apparatus set forth in claim 19 wherein said reading means further comprises analog-to-digital converter/multiplexer means having signal inputs coupled to said input means and to said level-indicating means, and control inputs and a signal output coupled to said microprocessor-based control means.

21. Apparatus for automatically analyzing a refrigeration system which includes compressor, condenser and evaporator means interconnected by conduit means in a refrigerant loop, said apparatus comprising:
   temperature probe means constructed for manual placement at each of a plurality of preselected points in turn around said loop1 to provide a signal indicative of temperature at each said point,
   means for reading and storing each said temperature signal in turn,
   memory means having prestored therein information indicative of standards and ranges of temperature data for properly operating refrigeration systems,
   means for comparing said stored temperature signals to each other and to said prestored standards and ranges to diagnose a plurality of fault conditions as a function of such comparison, and means for displaying diagnosed fault conditions to an operator.

22. The apparatus set forth in claim 21 wherein said fault-displaying means comprises multiple-character alphanumeric display means for displaying said fault conditions in plain text.

23. The apparatus set forth in claim 22 further comprising alphanumeric keypad data entry means for entering data independently of said temperature probe means.

24. The apparatus set forth in claim 23 wherein said temperature reading and storing means and said comparing means comprise microprocessor-based control means for storing temperature readings in a predetermined sequence, and for indicating said sequence at said display means.

25. The apparatus set forth in claim 24 wherein said data entry means and said control means include means for entering data from said entry means independently of said temperature probe means.

26. The apparatus set forth in claim 25 wherein said temperature probe means comprise a temperature probe and electrical signal conduction means, and wherein the remainder of said apparatus is contained within an enclosure having a connection for coupling to said conduction means.

27. The apparatus set forth in claim 26 wherein said temperature probe comprises a probe handle including a hollow tubular shaft projecting therefrom, a hollow probe tip sealingly affixed to an end of said shaft remote from said handle, said tip1 having a flat wall of heat conductive construction at an end thereof remote from said shaft, and a solid state temperature sensor affixed to said wall within said tip, said conductor means extending through said handle and shaft and being coupled to said sensor within said tip.

* * * * *